US012594773B2

(12) United States Patent
Moon et al.

(10) Patent No.: US 12,594,773 B2
(45) Date of Patent: Apr. 7, 2026

(54) INKJET PRINTING APPARATUS

(71) Applicant: Samsung Display Co., Ltd., Yongin-Si (KR)

(72) Inventors: Jeong Woo Moon, Yongin-si (KR); Sung Yong Kang, Yongin-si (KR); Gounam Park, Yongin-si (KR); Jihoon Kim, Yongin-si (KR); Jong Sung You, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 122 days.

(21) Appl. No.: 18/442,110

(22) Filed: Feb. 15, 2024

(65) Prior Publication Data

US 2024/0408894 A1 Dec. 12, 2024

(30) Foreign Application Priority Data

Jun. 8, 2023 (KR) ........................ 10-2023-0073450

(51) Int. Cl.
*B41J 3/407* (2006.01)
*B41J 29/377* (2006.01)

(52) U.S. Cl.
CPC ............. *B41J 3/407* (2013.01); *B41J 29/377* (2013.01)

(58) Field of Classification Search
None
See application file for complete search history.

(56) References Cited

U.S. PATENT DOCUMENTS

| | | | | |
|---|---|---|---|---|
| 6,270,930 | B1 * | 8/2001 | Okabe | G02B 5/201 430/7 |
| 2004/0246309 | A1 * | 12/2004 | Watanabe | B41J 2/17509 347/55 |

FOREIGN PATENT DOCUMENTS

| | | | |
|---|---|---|---|
| KR | 10-2015-0125873 | A | 11/2015 |
| KR | 10-2016-0141127 | A | 12/2016 |
| KR | 10-2176438 | B1 | 11/2020 |
| KR | 10-2022-0080419 | A | 6/2022 |

* cited by examiner

*Primary Examiner* — Scott A Richmond
(74) *Attorney, Agent, or Firm* — Innovation Counsel LLP

(57) ABSTRACT

An inkjet printing apparatus according to an embodiment includes a stage for supporting a substrate and an inkjet head disposed above the stage and discharging resin toward the stage. The stage includes a first stage part having a first thermal conductivity, and a second stage part disposed around the first stage part and surrounding at least a portion of the first stage part, wherein the second stage part has a second thermal conductivity that is greater than the first thermal conductivity.

20 Claims, 16 Drawing Sheets

INKJET PRINTING APPARATUS

CROSS-REFERENCE TO RELATED APPLICATION

This application claims priority to and the benefit of Korean Patent Application No. 10-2023-0073450 filed at the Korean Intellectual Property Office on Jun. 8, 2023, the entire contents of which are incorporated herein by reference.

BACKGROUND

(a) Technical Field

This disclosure relates to an inkjet printing apparatus, and more particularly, to an inkjet printing apparatus including a plurality of stages.

(b) Description of the Related Art

The display device is a device that displays images, and includes different types such as a liquid crystal display device, a light emitting display device, a micro LED display device, and the like.

Such a display device may be formed by stacking a plurality of layers on a substrate, and an inkjet printing apparatus may be used as one of various methods of forming each layer. For example, an organic thin film layer, a light emitting layer, an adhesive layer, an insulating film, and the like of a display device may be formed using an inkjet printing apparatus.

For example, in order to bond the display panel and the cover glass, optically clear resin (OCR), which is a liquid adhesive, may be applied to the display panel by an inkjet method. When bonding the display panel and the cover glass, the profile of the resin at the outer portion may affect the dead space of the product, and it is advantageous to reduce the dead space of the product when the outer edges of the resin has a steep slope that resembles a vertical sidewall. Therefore, there is a need for a method of forming an efficient edge profile when applying a resin to a substrate by an inkjet printing method.

SUMMARY

The embodiments provide an inkjet printing apparatus capable of forming a desired profile during inkjet coating. In addition, the embodiments provide an inkjet printing apparatus that can form a profile closer to that of a vertical sidewall at the edge of the resin while reducing the number of inkjet coating processes.

An inkjet printing apparatus according to an embodiment includes a stage for supporting a substrate and an inkjet head disposed above the stage and discharging resin toward the stage. The stage includes a first stage part having a first thermal conductivity and a second stage part disposed around the first stage part and surrounding at least part of the first stage part, wherein the second stage part has a second thermal conductivity. The second thermal conductivity is greater than the first thermal conductivity.

The substrate may cover an entirety of the first stage part and at least a portion of the second stage part.

An edge of the substrate may extend beyond an edge of the first stage part, and an edge of the second stage part may extend beyond the edge of the substrate.

An upper surface of the first stage part and an upper surface of the second stage part may be coplanar.

The second stage part may include a cooling unit.

The second stage part may be disposed at a corner portion of the first stage part.

The second stage part may be separable from the first stage part by being movable in a vertical direction relative to the first stage part while supporting the substrate.

The inkjet printing apparatus may further include a third stage part disposed around the first stage part and having a third thermal conductivity that is higher than the first thermal conductivity.

The second stage part may be separable from the third stage part, and at least one of the second stage part and the third stage part may be movable in a vertical direction while supporting the substrate.

At least one of the second stage part and the third stage part may include a cooling unit.

The first stage part may include at least one of polyetheretherketone, polycarbonate, polyoxymethylene, and polypropylene.

The second stage part may include metal.

The substrate may include a first region above the first stage part and a second region above the second stage part. Resin on the first region may be at a higher temperature than resin on the second region.

A width of the second region above the second stage part may be about 0.3 mm to about 3 mm.

The inkjet printing apparatus may further include a third stage part that at least partially overlaps the first stage part and has higher thermal conductivity than the first stage part.

An upper surface of the first stage part and an upper surface of the third stage part may be coplanar.

The first stage part may include at least one of polyetheretherketone, polycarbonate, polyoxymethylene, and polypropylene.

The third stage part may include metal.

The substrate may include a first region above the first stage part and a third region above the third stage part. The resin that is on the first region is in a higher temperature state than the resin that is on the third region.

The third stage part may include a cooling unit.

According to the embodiments, an inkjet printing apparatus capable of controlling the profile of an edge area may be provided. According to the embodiments, a desired profile of the resin (e.g., a profile close to vertical at the edge) may be formed in the edge region without additional coating during the inkjet process. In addition, the edge profile of the resin can be controlled with a small number of application methods, and the dead space of the product can be reduced while reducing equipment investment costs.

DETAILED DESCRIPTION OF THE EMBODIMENTS

Figure 1:
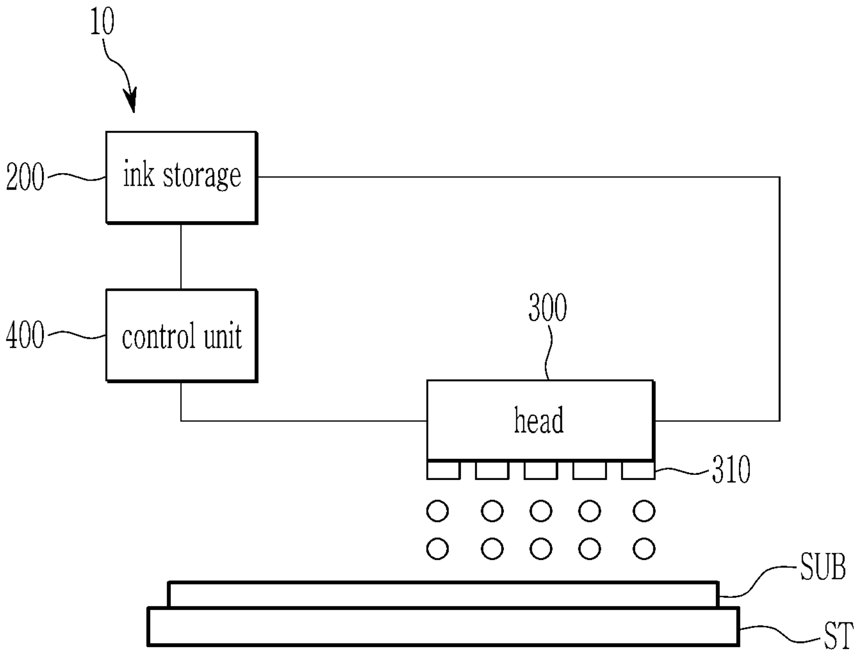
FIG. 1 is a drawing schematically illustrating an inkjet printing apparatus according to an embodiment.

Hereinafter, various embodiments will be described in detail with reference to the accompanying drawings so that a person of ordinary skill in the art can easily carry out. The inventive concept may be embodied in many different forms, and is not limited to the embodiments set forth herein.

To clearly describe the inventive concept, parts irrelevant to the description are omitted, and the same reference numerals are assigned to the same or similar constituent elements throughout the specification.

In addition, since the size and thickness of each component shown in the drawings are arbitrarily shown for convenience of explanation, the inventive concept is not necessarily limited to that which is shown.

In the drawings, the thickness is shown enlarged to clearly express the various layers and regions. In the drawings, for convenience of explanation, the thicknesses of some layers and regions are exaggerated.

In addition, when a part such as a layer, film, region, or plate is said to be "above" or "on" another part, this includes not only the case where it is "directly on" the other part, but also the case where there is an intervening part between the two parts. Conversely, when a part is said to be "directly on" another part, it means that there is no intervening part between the parts.

In addition, being "above" or "on" a reference part means being positioned above or below the reference part, and does not necessarily mean being positioned "above" or "on" it in the opposite direction of gravity. In addition, throughout the specification, when a certain component is said to "include," it means that it may further include other components without excluding other components unless otherwise stated.

Also, throughout the specification, a "planar image," is a view from the top plane, and a "cross-sectional image," is a viewed from the side with a target section cut in a direction orthogonal to the top plane.

In addition, when two components "overlap," it means that one of the components at least partially covers the other in a cross-sectional image unless otherwise specified.

FIG. 1 is a drawing schematically illustrating an inkjet printing apparatus according to an embodiment.

Referring to FIG. 1, the inkjet printing apparatus 10 may include a stage ST, an ink storage unit 200, an inkjet head 300, a nozzle unit 310, and a control unit 400.

The inkjet printing apparatus 10 may be used to manufacture a display device. A substrate SUB, which is a printing object, may be placed on the stage ST. The substrate SUB may be an object to which liquid adhesive resin (e.g., optically clear resin (OCR)) is coated by the inkjet printing apparatus 10 among constituent elements of the display device. The substrate SUB may be or include a display panel. The display panel may be a light emitting display panel including organic light emitting devices or inorganic light emitting devices. For instance, an adhesive layer may be formed on the surface of the display panel to join the display panel and the cover glass; for this, resin can be applied to the surface of the substrate SUB (for example, the display panel) placed on the stage ST using an inkjet method. A structure of the display device will be described with reference to FIG. 16.

The ink storage unit 200 may store ink used in an inkjet printing apparatus. The ink storage unit 200 may supply stored ink to the inkjet head 300. The ink storage unit 200 may be provided separately from the inkjet head 300 or may be provided integrally with the inkjet head 300.

The inkjet head 300 is connected to the ink storage unit 200, and it may eject ink supplied from the ink storage unit 200 at a certain rate through the nozzle unit 310.

The nozzle unit 310 may be positioned at the bottom of the inkjet head 300. The nozzle unit 310 may include a plurality of nozzles. The nozzle unit 310 may extend from the inkjet head 300 toward the stage ST, or may be provided in the form of a hole or opening on a lower surface of the inkjet head positioned above the stage ST. Ink may drip onto the substrate SUB through the nozzle unit 310. The number, spacing, and size of the nozzle unit 310 may be changed.

Figure 2:
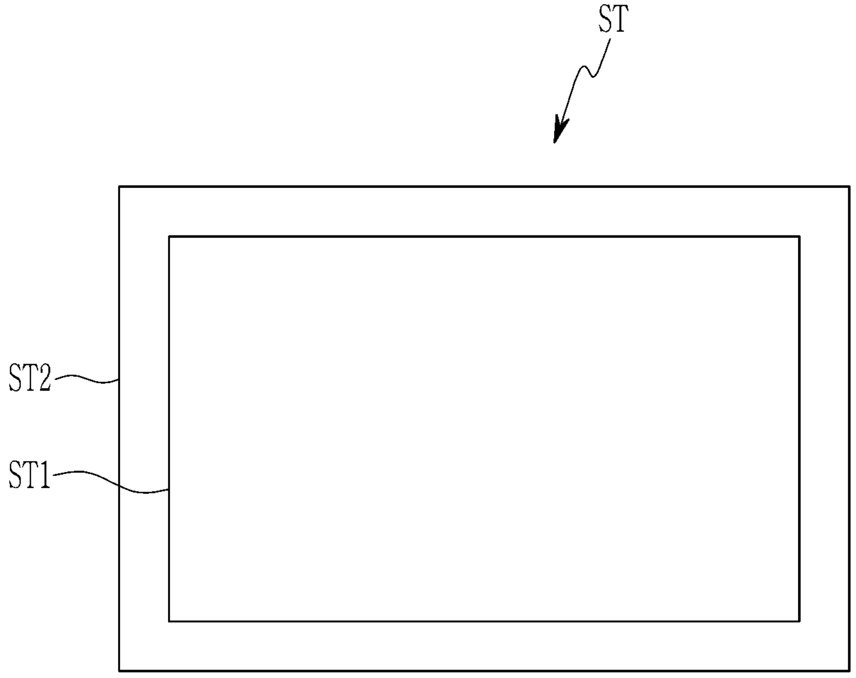
FIG. 2 is a top plan view of a stage according to an embodiment.

The control unit 400 is connected to each component of the inkjet printing apparatus 10 and may control the overall operation of the inkjet printing apparatus 10. For example, the control unit 400 may be electrically connected to the inkjet head 300. The control unit 400 may control the inkjet head 300 to eject ink. The control unit 400 may control the movement of the inkjet head 300. The control unit 400 may include a plurality of modules providing a plurality of functions, or may include a single module. FIG. 2 is a top plan view of a stage according to an embodiment, and FIG. 3 is a top plan view of a substrate mounted on the stage of FIG. 2.

Figure 3:
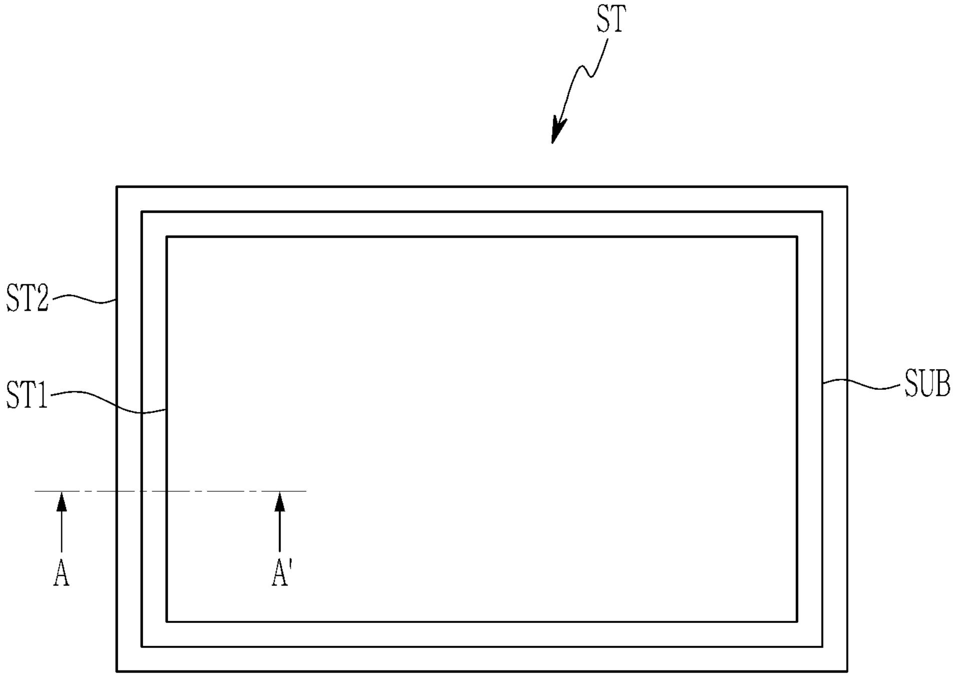
FIG. 3 is a top plan view in which a substrate is placed on a stage according to an embodiment.

Referring to FIG. 2 and FIG. 3, an inkjet printing apparatus according to an embodiment may include a stage ST on which a substrate SUB placed while an inkjet printing process is performed.

The stage ST according to an embodiment may include a first stage part ST1 and a second stage part ST2 positioned around the first stage part ST1. The first stage part ST1 on the plane includes the central part of the stage ST, and the second stage part ST2 may surround at least part of the first stage part ST1 and be arranged along the edge of the first stage part ST1 like a frame. The first stage part ST1 and the second stage part ST2 may meet each other at the cross-sectional boundary, and the upper surface of the first stage part ST1 and the upper surface of the second stage part ST2 may be coplanar. In an embodiment, the first stage part ST1 and the second stage part ST2 are integrated as a single stage ST, and may be different regions in the stage ST. The first stage part ST1 and the second stage part ST2 may be provided as separate components.

The first stage part ST1 and the second stage part ST2 may have different thermal conductivities. The first stage part ST1 including the central portion of the stage ST may include a material having a first thermal conductivity. The second stage part ST2, which is positioned around the perimeter of the first stage part ST1 and includes the edges of the stage ST, may contain a material with a second thermal conductivity. The first thermal conductivity is lower than the second thermal conductivity. For example, the first stage part ST1 may include plastics resins such as polyether ether ketone, polycarbonate, polyoxymethylene, or polypropylene, and the second stage part ST2 may include metals such as aluminum (Al), copper (Cu), or iron (Fe). The listed materials are illustrative of the second thermal conductivity being higher than the first thermal conductivity, and are not meant to be exhaustive.

FIG. 3 depicts a top view of the substrate SUB placed on the stage ST. As shown, the substrate SUB is mounted on the stage ST such that the edges of the substrate SUB are between the edges of the first stage part ST1 and the edges of the second stage part ST2 in plan view. With the first stage part ST1, the second stage part ST2, and the substrate SUB concentrically arranged in plan view, the edges of the substrate SUB may be farther from the center than the edges of the first stage part ST1 but not as far from the center as the edges of the second stage part ST2. The area surrounded by the edges of the first stage part ST1 in plan view may be smaller than the area surrounded by the edges of the substrate SUB, and the area surrounded by the edges of the second stage part ST2 may be larger than the area surrounded by the edges of the substrate SUB. The flat substrate SUB may overlap the front of the first stage part ST1, and may overlap at least a portion of the second stage part ST2. Although FIG. 2 and FIG. 3 show the substrate SUB arranged concentrically with the stage ST, this is not a limitation of the disclosure.

Furthermore, although the stage ST is depicted as a rectangle, the shape of the stage ST may be changed according to the embodiment, and may be circular, elliptical, polygonal, or irregular, and the shapes of the first and second stage parts ST1 and ST2 may also be modified.

Figure 4:
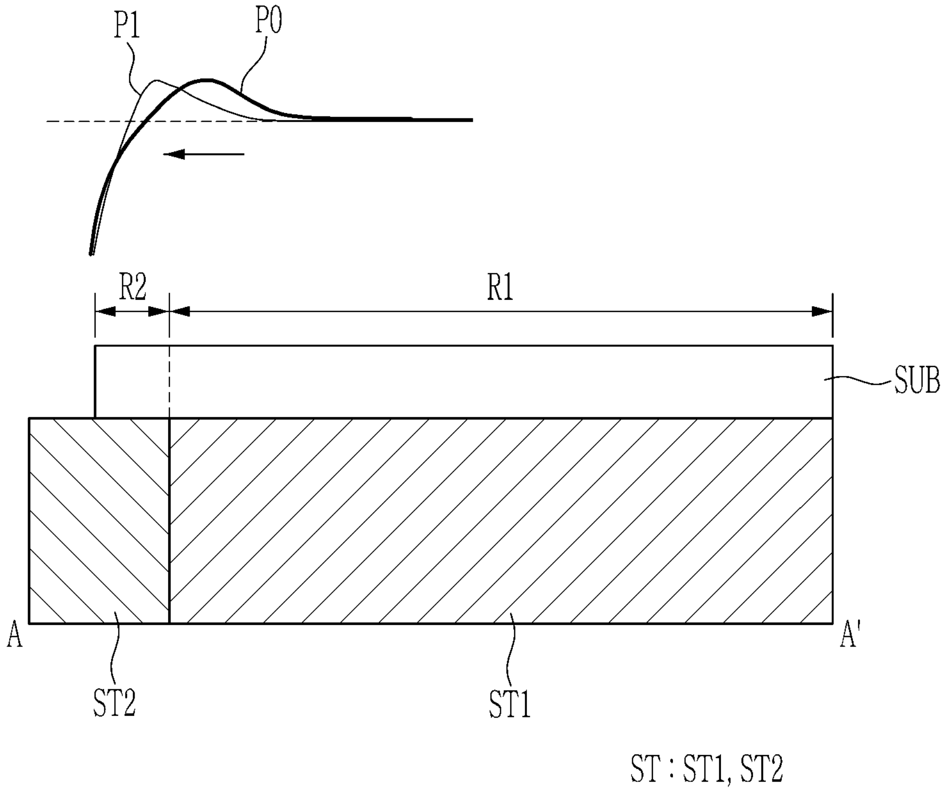
FIG. 4 to FIG. 6 are cross-sectional views of an embodiment taken along line A-A' in FIG. 3.

FIG. 4 is a cross-sectional view of one embodiment taken along line A-A' in FIG. 3.

Referring to FIG. 4, the substrate SUB is positioned on the stage ST. Resin may be applied on the substrate SUB by an inkjet printing method. FIG. 4 also shows cross-sectional profiles P0 and P1 of the resin applied on the substrate SUB.

The top surface of the first stage part ST1 and the top surface of the second stage part ST2 may be on the same plane (i.e., coplanar), and a substrate SUB may be mounted on the top surface of the stage ST. The substrate SUB may include a first area R1 covering the first stage part ST1 and a second area R2 covering the second stage part ST2.

As previously described, the substrate SUB may cover the front of the first stage part ST1, and may at least partially cover the second stage part ST2. The substrate SUB may be arranged to cover the edge area of the second stage part ST2, and the width of the second area R2 overlapping the second stage part ST2 and the substrate SUB may be approximately 0.3 mm to 3 mm. The width of the second region R2 may be the same as the distance between the edge of the first stage part ST1 on the plane and the edge of the substrate SUB.

The first stage part ST1 includes the central part of the stage ST, and may include a material with a first thermal conductivity. The second stage part ST2 is positioned adjacent to the edge of the first stage part ST1, and may include a material with a second thermal conductivity that is higher than the first thermal conductivity.

In an embodiment, the resin may be discharged at a temperature higher than room temperature. The first stage part ST1 contains a material with the first (low) thermal conductivity, so the resin discharged in the first area R1 of the substrate SUB may maintain a relatively high temperature without losing heat to the lower first stage part ST1. In contrast, the second stage part ST2 contains a material with the second (high) thermal conductivity, so the resin discharged in the second area R2 of the substrate SUB may reach a relatively low temperature due to the heat transferring to the second stage part ST2. When such a relative temperature gradient is formed, the viscous resin may move from the high-temperature region R1 to the low-temperature region R2 due to the Marangoni effect, and accordingly, the cross-sectional profile of the resin may change from the initial coating state profile P0 to the deformed profile P1 due to the temperature difference.

The Marangoni effect refers to the flow of fluid due to the difference in surface tension. Since a liquid with high surface tension pulls on the surrounding liquid more strongly than a liquid with low surface tension, a gradient in surface tension naturally causes the liquid to flow from a region of low surface tension to a region of high surface tension. This surface tension gradient may be caused by a temperature gradient. In the case of a fluid, since surface tension is relatively low in a high-temperature region and surface tension is relatively high in a low-temperature region, the fluid may move from a high-temperature region with a low surface tension to a low-temperature region with a high surface tension.

Referring to the profile of FIG. 4, P0 is a profile in an initial application state of resin, and P1 is a profile deformed by a temperature difference according to an area of the substrate SUB. As depicted, in one embodiment, the resin may move from a relatively high-temperature first region R1 to a relatively low-temperature second region R2 after initial application, and accordingly, the center of the resin bump (the part where the resin is applied most thickly) may move from the center of the substrate SUB toward the edge, and the cross-sectional profile P1 of the resin may have a steeper slope at the edge of the substrate SUB than the profile P0 at the time of initial application.

In this way, the stage of the inkjet printing apparatus according to an embodiment includes a first stage part ST1 and a second stage part ST2 with different thermal conductivities, causing a temperature distribution of the resin coated on the substrate SUB that is mounted on the stage ST, thereby inducing the movement of the resin to the edge of the substrate and allowing the formation of the desired profile at the edge part. Accordingly, sufficient bumps may be formed in the edge region without additional processing. Due to the migration of the bump toward the edges, a steeper—almost vertical—profile is formed in the edge region so that the boundary of the contact portion of the product is not visually recognized and dead space may be reduced.

Figure 5:
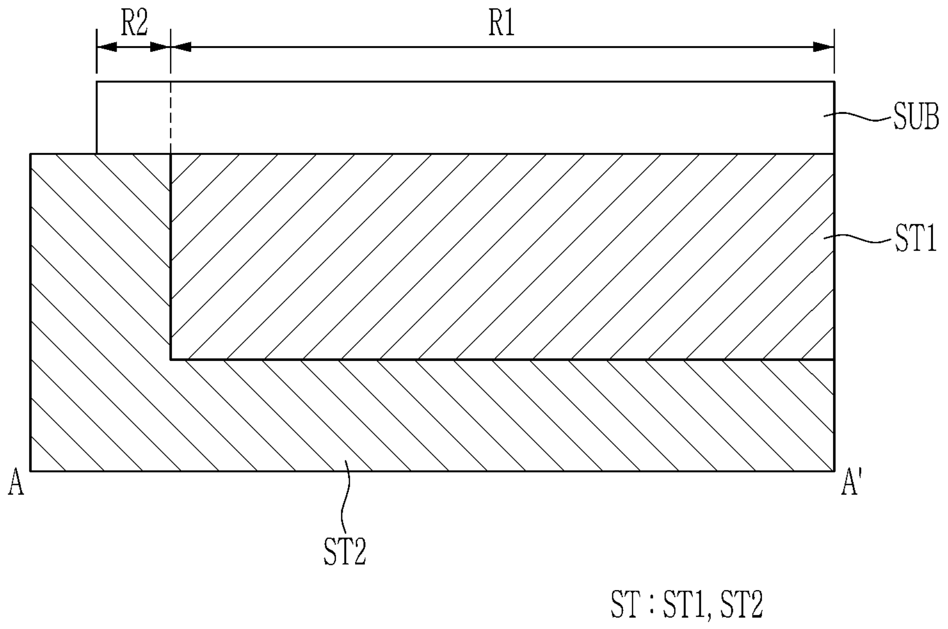
Figure 6:
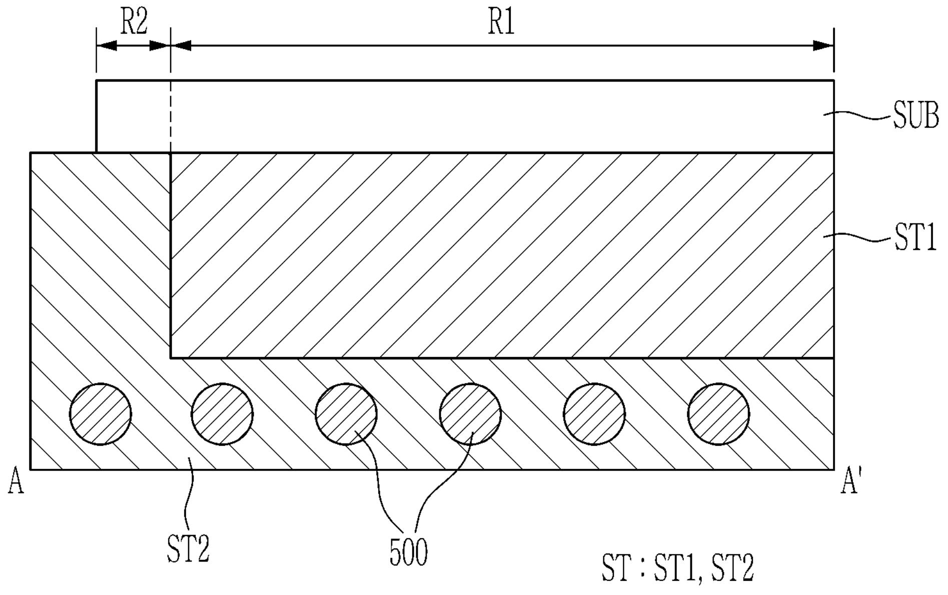

FIG. 5 differs from the embodiment of FIG. 4 in that the second stage part ST2 contains the first stage part ST1, and FIG. 6 differs from the embodiment of FIG. 5 in that the second stage part ST2 further includes a cooling unit 500. Redundant descriptions of the same components as those of the embodiment of FIG. 4 are omitted. The omitted configuration follows the embodiment of FIG. 4.

Referring to FIG. 5, the second stage part ST2 and the first stage part ST1 may at least partially overlap, and the second stage part ST2 may also be formed to accommodate the first stage part ST1. The top surface of the first stage part ST1 and the top surface of the second stage part ST2 may be on the same plane. The lower surface of the first stage part ST1 and the lower surface of the second stage part ST2 may be on the same plane or on different planes.

The first stage part ST1 and the second stage part ST2 include materials with different thermal conductivities, and the thermal conductivity of the second stage part ST2 may be higher than the thermal conductivity of the first stage part ST1. Accordingly, when the substrate SUB is mounted on the stage ST, the temperature of the resin applied to the second area R2 covering the second stage part ST2 may be lower than the temperature of the resin applied to the first area R1 covering the first stage part ST1. According to such a temperature distribution, the resin may migrate from the high-temperature region R1 to the low-temperature region R2, allowing a bump to be formed on the edge of the substrate SUB without additional coating.

Also, as shown in FIG. 6, the second stage part ST2 may further include a cooling unit 500 to more quickly lower the temperature of the resin applied in the second area R2. In an embodiment, the cooling unit 500 may include a conduit that lowers the temperature of the stage by circulating cooling water. For example, the cooling device 500 may include a water jacket, water pump, thermostat, drive belt, etc., and it may be a coolant circulation device that circulates coolant to lower the temperature of the second stage part ST2.

Figure 7:
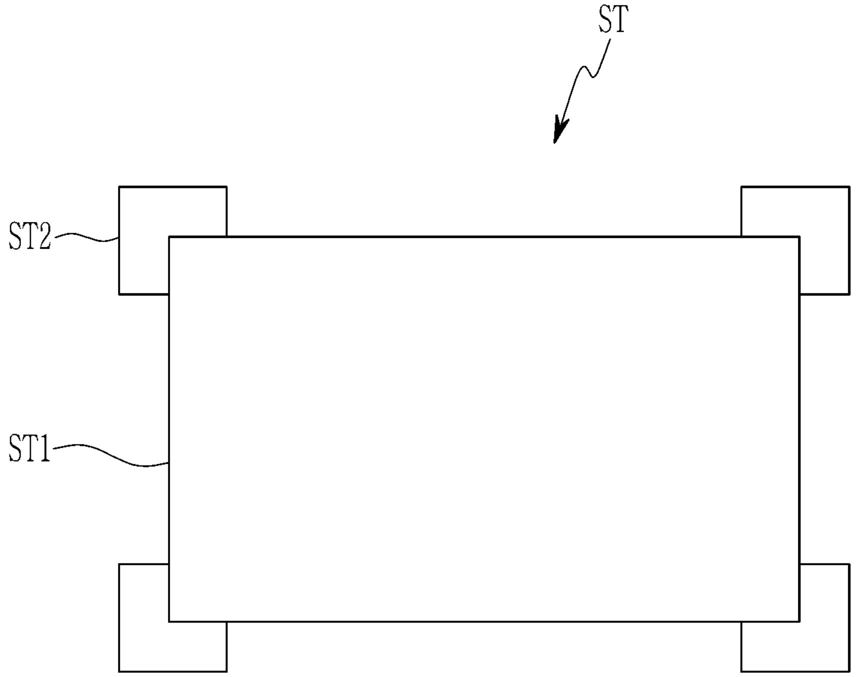
FIG. 7 is a top plan view of a stage according to an embodiment.
Figure 8:
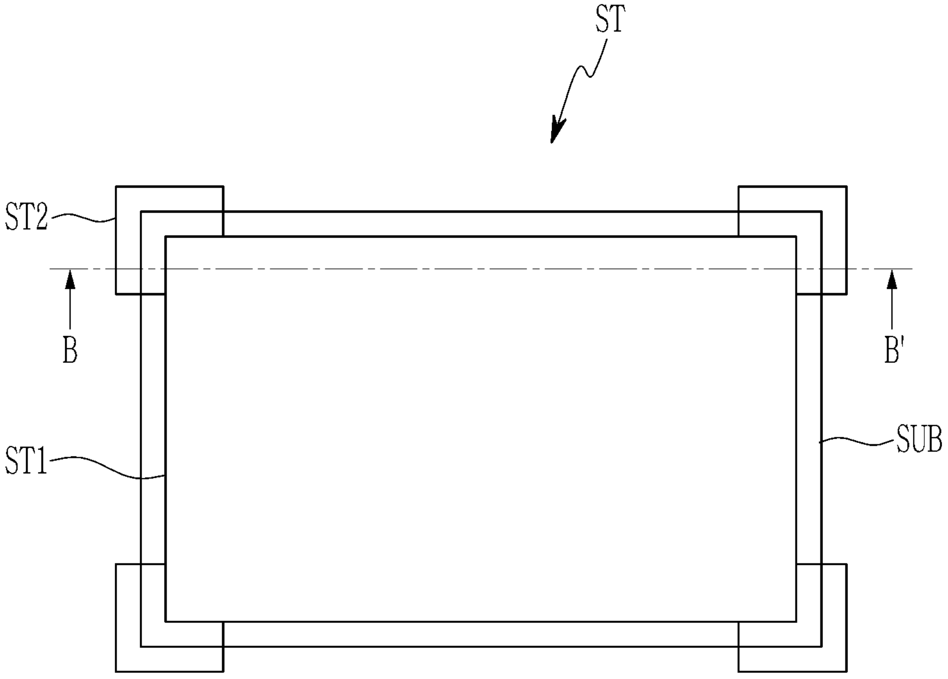
FIG. 8 is a top plan view in which a substrate is placed on a stage according to an embodiment.
Figure 9:
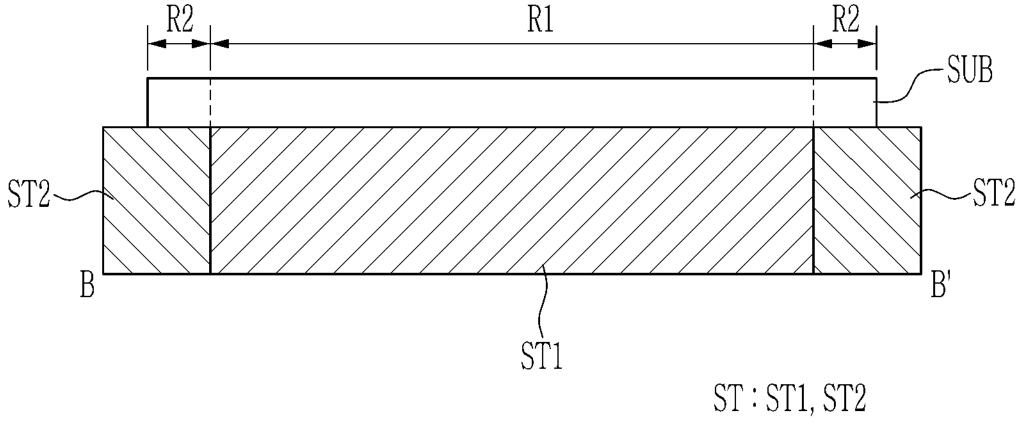
FIG. 9 is a cross-sectional view of an embodiment taken along line B-B' in FIG. 8.
Figure 10:
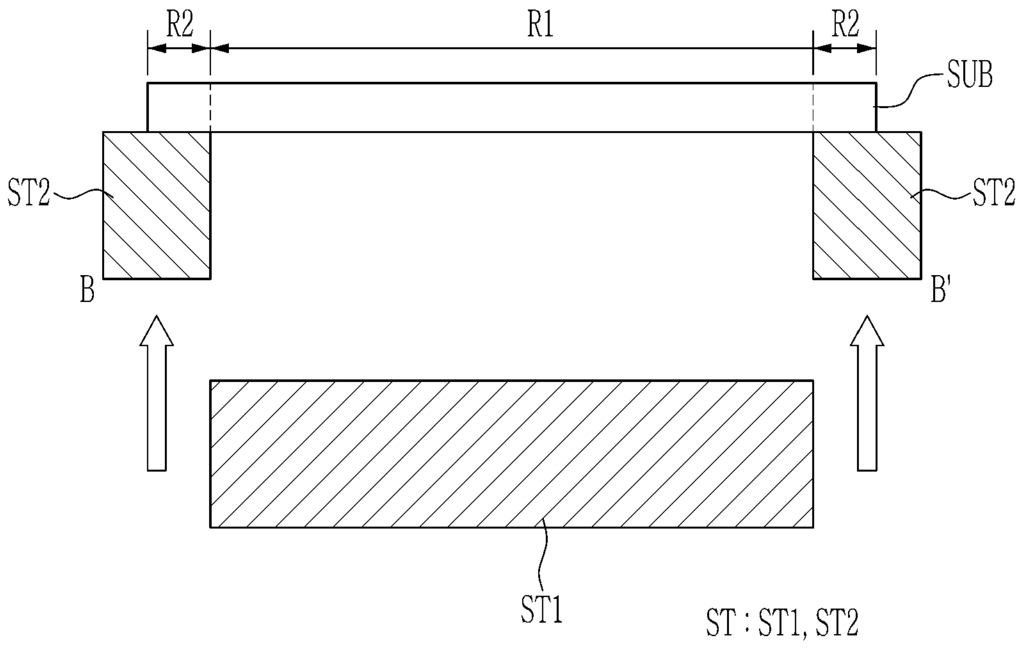
FIG. 10 is a cross-sectional view of a lift operation of a stage according to an embodiment.

FIG. 7 is a plan view of a stage according to an embodiment, and FIG. 8 is a plan view of a substrate mounted on the stage according to the embodiment of FIG. 7. FIG. 9 is a cross-sectional view of an embodiment taken along line B-B' in FIG. 8, and FIG. 10 is a cross-sectional view of a lift operation of a stage according to the embodiment of FIG. 9.

The embodiments of FIG. 7 to FIG. 10 are different from the embodiment of FIG. 2 in that the second stage part ST2 is positioned only at the corner of the first stage part ST1.

In an embodiment, the first stage part ST1 includes a central portion of the stage, and the second stage part ST2 may be disposed adjacent to each corner portion of the first stage part ST1. The top surfaces of the first stage part ST1 and the second stage part ST2 are flush, thus forming a plane, and a substrate SUB may be placed on the top surface of the stage ST. The substrate SUB may include a first region R1 overlapping the first stage part ST1 and a second region R2 overlapping the second stage part ST2.

Referring to FIG. 8 and FIG. 9, when the substrate SUB is mounted on the stage ST, the edge of the first stage part ST1 may be positioned close to the center of the stage ST. In plan view, the edges of the substrate SUB may be between the edges of the first stage part ST1 and the edges of the second stage part ST2. The area surrounded by the edges of the first stage part ST1 on the plane may be smaller than the area surrounded by the edges of the substrate SUB. The substrate SUB may overlap the front of the first stage part ST1.

The second stage ST2 may be positioned at each corner of the first stage part ST1. A "corner," as used herein, is an area where two straight edges meet to make an angle. When the substrate SUB rests on the stage ST, the second stage part ST2 may be at least partially covered by the corner of the substrate SUB.

The first stage part ST1 and the second stage part ST2 contain materials with different thermal conductivities, and the thermal conductivity of the second stage part ST2 may be higher than that of the first stage ST1. For example, the first stage part ST1 may include plastics, resins with low thermal conductivity such as polyether ether ketone, polycarbonate, polyoxymethylene, polypropylene, and the like. The second stage part ST2 may include metals with high thermal conductivity such as aluminum (Al), copper (Cu), iron (Fe), and is not limited to these.

Accordingly, the temperature of the resin applied to the second area R2 of the substrate SUB covering the second stage part ST2 may be lower than the temperature of the resin applied to the first area R1 of the substrate SUB covering the first stage part ST1. According to the embodiment, the second stage part ST2 may further include a cooling unit to more quickly lower the temperature of the resin applied to the second area R2. The resin coated on the substrate SUB will have a temperature distortion due to the difference in thermal conductivity between the first stage part ST1 and the second stage part ST2. Accordingly, the resin may migrate from a relatively high-temperature region R1 to a relatively low-temperature region R2, allowing sufficient resin to be coated on the corner part of the substrate SUB without additional coating material or process. The inventive concept entails evenly depositing resin on a substrate SUB by forming a thermal conductivity differential between different parts of the stage ST, then depositing the resin on an area with the lowest thermal conductivity to cause resin migration to the target area having a higher thermal conductivity.

Also, referring to FIG. 10, in an embodiment, the second stage part ST2 may be separable from the first stage part ST1, for example by a vertical movement as shown by the arrows. The second stage part ST2 is connected to the drive unit (not shown) and may move in a vertical direction; accordingly, the second stage part ST2 may accommodate a substrate SUB and dock it on the first stage part ST1, or it may lift the substrate SUB that is docked on the first stage part ST1. The second stage part ST2 may vertically lift the substrate SUB by supporting a corner portion of the substrate SUB.

Figure 11:
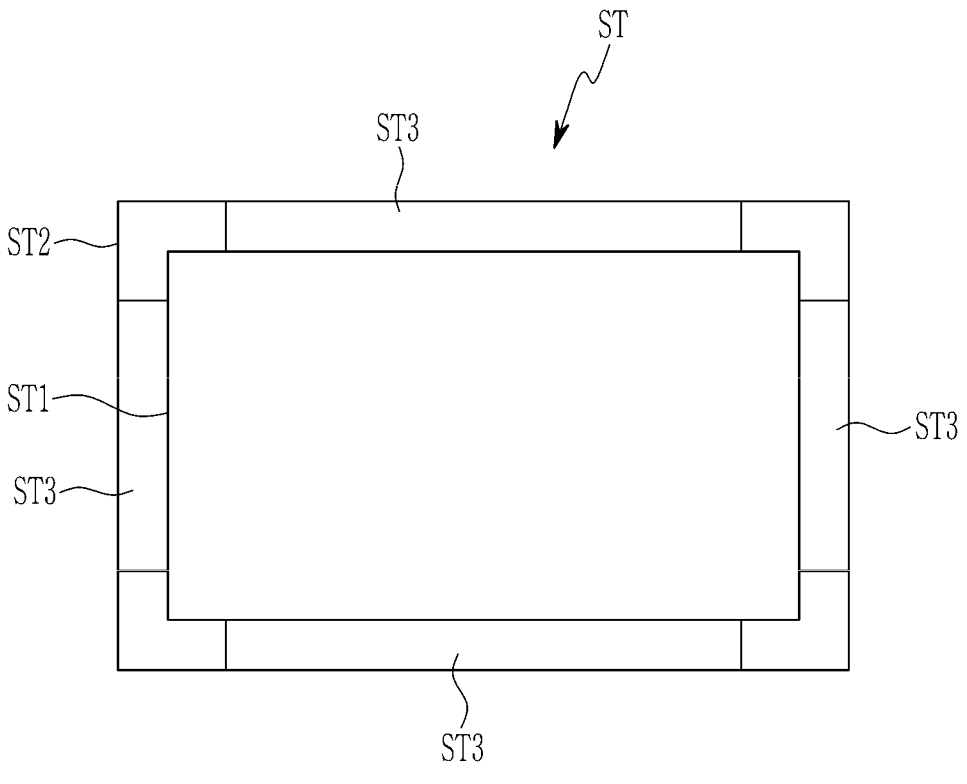
FIG. 11 is a top plan view of a stage according to an embodiment.
Figure 12:
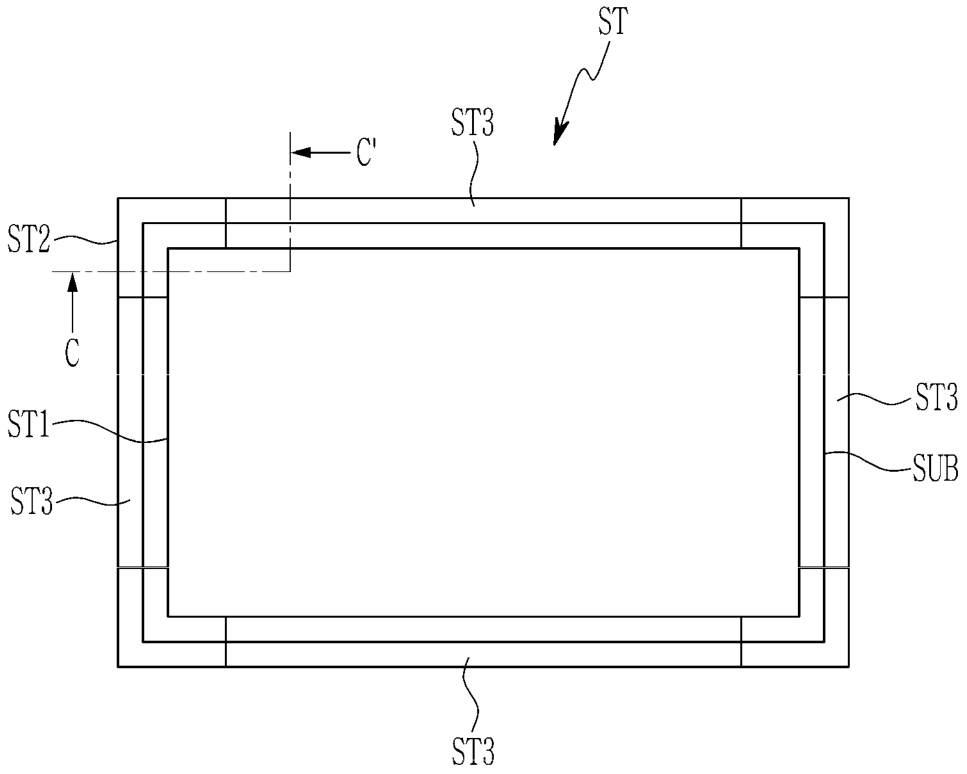
FIG. 12 is a top plan view of a substrate mounted on a stage according to an embodiment.
Figure 13:
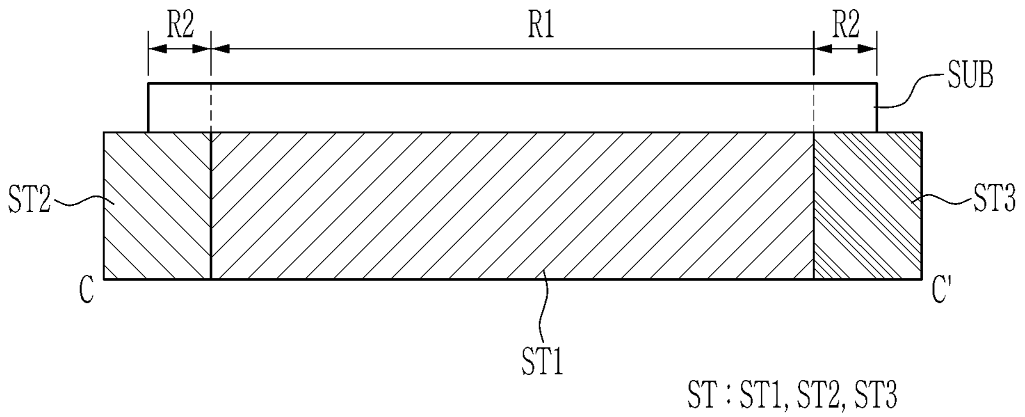
FIG. 13 is a cross-sectional view of an embodiment taken along line C-C' in FIG. 12.

FIG. 11 is a top plan view of a stage according to an embodiment, and FIG. 12 is a top plan view of a substrate mounted on the stage according to the embodiment of FIG. 11. FIG. 13 is a cross-sectional view of an embodiment taken along line C-C' in FIG. 12.

Hereinafter, stages of an inkjet printing apparatus according to an embodiment will be described with reference to FIG. 11 to FIG. 13.

The difference in the embodiments of FIG. 11, FIG. 12, and FIG. 13 compared to the embodiment of FIG. 7 is that they include a third stage part ST3 positioned between neighboring second stage parts ST2 that are positioned at the corners of the first stage part ST1.

In an embodiment, the stage ST may include a first stage part ST1 that includes the central portion of the stage, a second stage part ST2 arranged at each corner of the first stage part ST1, and a third stage part ST3 that is arranged between neighboring second stage parts ST2 and adjacent on each side of the first stage part ST1.

The second stage part ST2 and the third stage part ST3 may be arranged to surround at least a portion of the first stage part ST1. The top surfaces of the first stage part ST1, the second stage part ST2, and the third stage part ST3 may be coplanar, and a substrate SUB may be mounted on the top surface of the stage ST. The substrate SUB may include a first area R1 overlapping the first stage part ST1, a second area R2 overlapping the second stage part ST2, and a third area R3 overlapping the third stage part ST3.

Referring to FIG. 12 and FIG. 13, the substrate SUB rests on the stage ST such that the edges of the substrate SUB extend beyond the edges of the first stage part ST1. An area surrounded by an edge of the first stage part ST1 may be smaller than an area surrounded by an edge of the substrate SUB on a plane. The substrate SUB may cover the front surface of the first stage ST1.

The second stage part ST2 may be positioned at each corner of the first stage part ST1. In the state where the substrate SUB is resting on the stage ST, the second stage part ST2 may overlap at least a portion of the corner of the substrate SUB.

The third stage part ST3 may be positioned adjacent to each side of the first stage part ST1. In an embodiment where the first stage part ST1 is rectangular, the third stage part ST3 may have four segments, one segment along each side of the first stage part ST1. The third stage part ST3 may be positioned between the second stage part ST2 positioned in the corner section, and the second stage part ST3 and the third stage part ST3 may overlap the substrate SUB at least in part.

The first stage part ST1 may include plastics with low thermal conductivity such as polyether ether ketone, polycarbonate, polyoxymethylene, and polypropylene, but are not limited to these.

The second stage part ST2 and the third stage part ST3 may contain a material with a higher thermal conductivity than the first stage part ST1. For example, the second stage part ST2 and the third stage part ST3 may include metals with high thermal conductivity such as aluminum (Al), copper (Cu), and iron (Fe), but are not limited to these. The second stage part ST2 may contain the same or different materials as the third stage part ST3, and according to an embodiment, they may be separated from each other.

Accordingly, the temperature of the resin applied to the second area R2 and the third area R3 of the substrate SUB on the second stage part ST2 and the third stage part ST3 may be lower than the temperature of the resin applied to the first area R1 of the substrate SUB on the first stage part ST1. According to another embodiment, the second stage part ST2 and/or the third stage part ST3 may further include a cooling unit to lower the temperature of the resin applied in the second region R2 and/or the third region R3 faster.

In this way, the resin coated on the substrate SUB has a temperature gradient due to the difference in thermal conductivity between the first stage part ST1 and the second and third stage parts ST2 and ST3. Accordingly, the resin moves from the high-temperature region R1 to the low-temperature regions R2 and R3, so sufficient resin may be coated on the edges of the substrate SUB, including the corners, without additional coating material or process.

In an embodiment, the second stage part ST2 and/or the third stage part ST3 may be separable from the first stage part ST1 by moving in the vertical direction relative to the first stage part ST1. The second stage part ST2 and/or the third stage part ST3 may be connected to the drive part (not shown) and may move in an up and down direction. While moving up and down, it may support the substrate SUB to mount on the stage ST, or it may lift the substrate SUB that is mounted on the stage ST. For example, the third stage part ST3 adjacent to the first stage part ST1 is fixed, and the second stage part ST2 positioned at the corner of the first stage part ST1 may be separated from the first stage part ST1 and the third stage part ST3, and moved in the vertical direction to move the substrate SUB.

According to an embodiment, the second stage part ST2 positioned at the corner of the first stage part ST1 is fixed, and the third stage part ST3 positioned on each side of the first stage part ST1 may be separated from the first stage part ST1 and the second stage part ST2 by moving in a vertical direction. The third stage part ST3 may carry the substrate SUB in a vertical direction.

In an embodiment, the stage ST is depicted as a square, but the shape of the stage ST may vary according to the embodiment, and may be circular, elliptical, polygonal, or irregular shapes, and the shapes of the first, second, and third stage parts ST1, ST2, and ST3 may also be variously modified.

Figure 14:
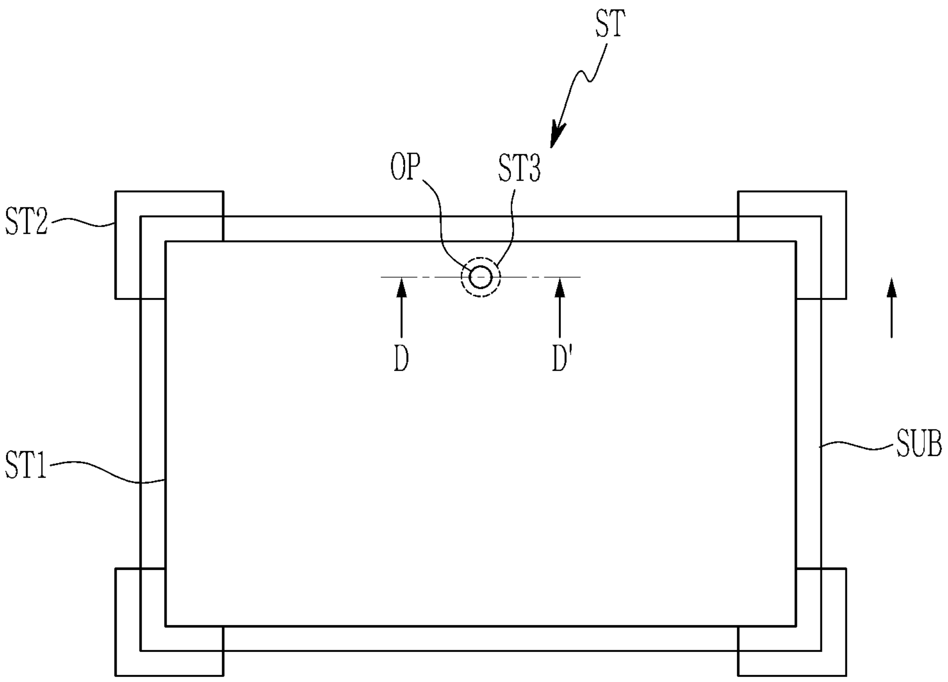
FIG. 14 is a top plan view in which a substrate is placed on a stage according to an embodiment.
Figure 15:
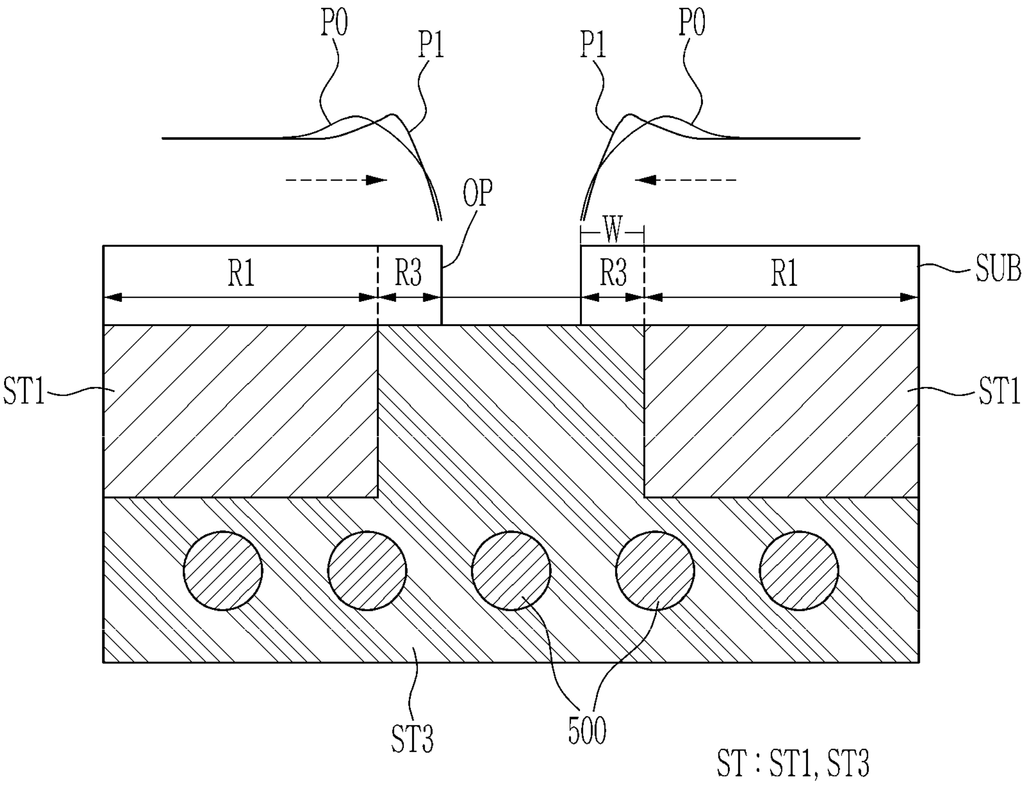
FIG. 15 is a cross-sectional view of an embodiment taken along line D-D' in FIG. 14.

FIG. 14 is a plan view of a substrate mounted on a stage according to an embodiment, and FIG. 15 is a cross-sectional view of the embodiment taken along line D-D' in FIG. 14.

FIG. 14 is different from the previous embodiment in that the substrate includes an opening. According to some embodiments, in order to add various functions to the display device, the substrate may include an opening therethrough. For substrates that include apertures, profile control at the boundaries of the apertures may be required.

Referring to FIG. 14 and FIG. 15, the stage ST may include a first stage part ST1 that includes the central portion of the stage, a second stage part ST2 arranged at each corner portion of the first stage part ST1, and a third stage part ST3 that is at least partially aligned with the opening OP of the substrate SUB.

The top surfaces of the first stage part ST1, the second stage part ST2, and the third stage part ST3 are coplanar, and a substrate SUB may be settled on the top surface of the stage ST. The substrate SUB may include a first area R1 covering the first stage part ST1 and a third area R3 covering the third stage part ST3.

When the substrate SUB is placed on the stage ST, the edges of the substrate SUB may extend beyond the edges of the first stage part ST1. The area of the first stage part ST1 may be smaller than the area of the substrate SUB, as viewed from the top. The substrate SUB may cover the front of the first stage part ST1.

The second stage part ST2 may be located at each corner of the first stage part ST1. When the substrate SUB is mounted on the stage ST, the second stage part ST2 may overlap at least a portion of the corner of the substrate SUB.

The third stage part ST3 is placed in a position corresponding to the opening OP of the substrate SUB, such that the third stage part ST3 forms a base of the opening OP. In some embodiments, it may have the same shape as the opening OP of the substrate SUB. In some embodiments, as depicted in FIG. 15, the third stage part ST3 may be wider than the opening OP and be covered by the third region R3 of the substrate SUB that defines the opening OP. The width W of the third region R3 may be approximately 0.3 mm to 3 mm. The width W of the third region R3 may be the same as the distance between the edge of the first stage part ST1 on the plane and the boundary of the opening OP.

The first stage part ST1 may be arranged around the third stage part ST3, and it may cover at least a portion of the third stage part ST3. The first stage part ST1 may include plastic resins with low thermal conductivity, such as polyether ether ketone, polycarbonate, polyoxymethylene, polypropylene, and so on, but it is not limited to these.

The third stage part ST3 may contain a material with a higher thermal conductivity than the first stage part ST1. For example, the third stage part ST3 may include materials with high thermal conductivity such as aluminum (Al), copper (Cu), and iron (Fe), and it is not limited to these.

In an embodiment, the resin may be discharged at a temperature higher than room temperature. The first stage part ST1 includes a material with a first thermal conductivity, so the resin discharged in the first area R1 of the substrate SUB may maintain a relatively high temperature state without heat transferring to the lower first stage part ST1. In contrast, the third stage part ST3 contains a material with a second thermal conductivity that is higher than the first thermal conductivity, so the resin discharged in the third area R3 of the substrate SUB may cool down faster by faster heat loss to the third stage part ST3 below. Accordingly, the temperature of the resin applied to the third region R3 of the substrate SUB above the third stage part ST3 may be lower than the temperature of the resin applied to the first region R1 of the substrate SUB covering the first stage part ST1. According to the embodiment, the third stage part ST3 may further include a cooling unit to lower the temperature of the resin applied in the third region R3 faster.

In this way, the resin coated on the substrate SUB has a temperature gradient due to the difference in thermal conductivity between the first stage part ST1 and the third stage part ST3. Accordingly, the resin moves from the high-temperature region R1 to the low-temperature region R3. By creating a temperature gradient, sufficient resin may be coated at the boundary of the opening OP of the substrate SUB without additional coating material, and a desired coating profile P1 with a steep slope at the edges may be formed.

Specifically referring to FIG. 15, it is possible to check the resin profile around the opening OP of the substrate SUB. P0 is the profile of the resin thickness when the resin is initially applied, and P1 is the profile after the resin moved due to the temperature difference. In other words, in an embodiment, the resin may move from the relatively high-temperature region R1 to the relatively low-temperature region R3 after the initial application, and accordingly, the center of the resin bump (the thickest coated portion of the resin) may move towards the edge of the opening OP. The cross-sectional profile P1 of the resin may be formed with a higher bump close to the edge of the opening OP, resulting in a profile with a steeper slope at the edge than the profile P0 at the initial coating.

As described above, since the inkjet printing apparatus according to an embodiment includes a plurality of stages ST1, ST2, and ST3 having different thermal conductivities, a temperature gradient of the resin applied to the substrate placed on the stage is generated, thereby generating a temperature gradient on the substrate. The temperature gradient causes the resin to move, making it unnecessary to apply more resin near the edges. Furthermore, the movement of the resin to the edges creates a steep-slope profile at the edge, which is the desired profile. In addition, when the substrate includes an opening, a desired profile may be formed by inducing movement of the resin around the opening. Accordingly, bumps may be formed without additional processes, and dead spaces around the openings of the substrate including the openings may be reduced by forming a profile with steeper slope.

Figure 16:
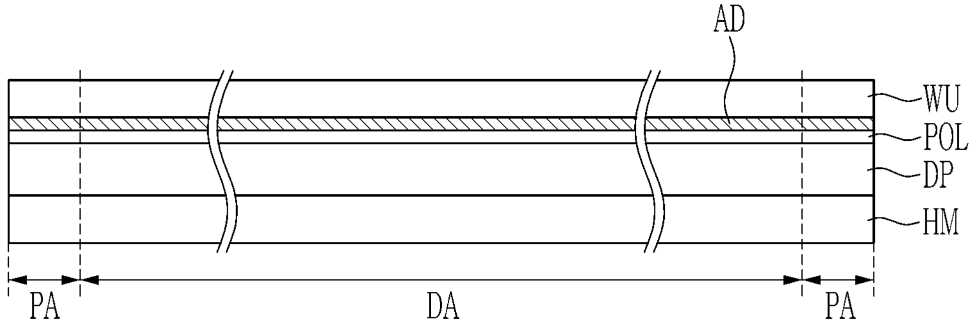
FIG. 16 is a cross-sectional view of a display device according to an embodiment.

FIG. 16 is a cross-sectional view of a display device according to an embodiment.

Referring to FIG. 16, the display device 1000 may include a cover window WU, a display panel DP, and a housing member HM. A polarizing layer POL may be positioned between the cover window WU and the display panel DP, and the polarizing layer POL may be attached by an adhesive to the display panel DP, or it may be formed on top of the display panel DP. The polarization layer POL may be a part of the display panel DP. The display device 1000 may additionally include electronic modules such as cameras or sensors.

The cover window WU is placed on the display panel DP to protect the front of the display panel DP. The cover window WU may include a transparent region corresponding to the display area DA and a blocking region corresponding to the non-display area PA. The transmission region may be an optically transparent region and may transmit incident light. The blocking region may be a region having relatively low light transmittance compared to the transmission region. The blocking region defines the shape of the transmission region, and the blocking region may surround the transmission region. The blocking region may represent a predetermined color. The blocking region may overlap with the non-display area PA of the display panel DP to prevent the non-display area PA from being recognized from the outside.

The display panel DP may be a rigid display panel or a flexible display panel. The display panel according to an embodiment is a light emitting display panel. For example, the display panel may be an organic light emitting display panel or a quantum dot light emitting display panel. An intermediate layer of the organic light emitting display panel may include a functional layer and a light emitting layer, and the light emitting layer may include an organic light emitting material. The intermediate layer of the quantum dot light emitting display panel may include quantum dots and quantum rods. Depending on the embodiment, it may be an inorganic light emitting display pattern including an inorganic light emitting diode. Hereinafter, the display panel DP will be described using an organic light emitting display panel.

The display panel DP displays an image on the front side. The front of the display panel DP includes the display area DA and the non-display area PA. The image is displayed on the display area DA. The non-display area PA may surround the display area DA.

The display panel DP may include multiple pixels PX positioned in the display area DA. Pixels PX may emit light in response to electrical signals. The lights emitted by pixels PX may gather to implement an image. A single pixel PX includes a pixel circuit part containing multiple transistors and a light emitting diode that receives current from the pixel circuit part and emits light. The pixel circuit part may include more capacitors. The number of transistors and capacitors included in one pixel PX and their connection relationship may be varied in many ways.

The polarization layer POL may be located on the upper surface of the display panel DP. The polarization layer POL may be formed to prevent light originating from the outside from being reflected off the display panel DP and recognized by the user. Here, the polarization layer POL may be attached to the display panel DP by the adhesive layer, and in this case, the adhesive layer may be formed using the inkjet printing apparatus described earlier. The organic layer formed on the display panel DP may be formed using the inkjet printing apparatus described earlier.

In an embodiment, the display panel DP may include a penetrating opening region or transparent region, and on the back of this part, electronic modules such as cameras or sensors may be positioned.

The display panel DP includes a non-display area PA where multiple signal lines and pads are positioned, extended from the display area DA. In the non-display area PA, a data driving unit may be positioned, and the pad portion of the non-display area PA may be electrically connected to a printed circuit board that includes a driving chip. An adhesive layer AD may be positioned between the polarizing layer POL and the cover window WU. The adhesive layer AD may be formed using the aforementioned inkjet printing apparatus.

Meanwhile, the display panel DP may further include a touch sensor capable of detecting a user's touch. The touch sensor may be positioned in front of the pixel PX and may include at least one touch electrode.

The housing member HM is placed at the bottom of the display panel DP. The housing member HM is combined with the cover window WU to form the appearance of the display device 1000. The housing member HM may include a material with relatively high rigidity. For example, the housing member HM may include a plurality of frames and/or plates made of glass, plastic, or metal. The housing member HM provides a predetermined accommodation space. The display panel DP may be accommodated in the accommodation space and protected from external impact.

Although the embodiments have been described in detail above, the scope of this disclosure is not limited thereto, and various modifications and improvements made by those skilled in the art using the basic concept of this closure defined in the following claims are also included in the scope.

What is claimed is:

1. An inkjet printing apparatus, comprising:
a stage for supporting a substrate; and
an inkjet head disposed above the stage and discharging resin toward the stage,
wherein the stage comprises:
a first stage part having a first thermal conductivity; and
a second stage part disposed around the first stage part and surrounding at least a portion of the first stage part, the second stage part having a second thermal conductivity,
wherein the second thermal conductivity is greater than the first thermal conductivity, and
at least a portion of an upper surface of the first stage part is not covered by the second state part.

2. The inkjet printing apparatus of claim 1, wherein:
the substrate covers an entirety of the first stage part and covers at least a portion of the second stage part.

3. The inkjet printing apparatus of claim 1, wherein:
an edge of the substrate extends beyond an edge of the first stage part, and an edge of the second stage part extends beyond the edge of the substrate.

4. The inkjet printing apparatus of claim 1, wherein:
an upper surface of the first stage part and an upper surface of the second stage part are coplanar.

5. The inkjet printing apparatus of claim 1, wherein:
the second stage part includes a cooling unit.

6. The inkjet printing apparatus of claim 1, wherein:
the second stage part is disposed at a corner of the first stage part.

7. The inkjet printing apparatus of claim 6, wherein:
the second stage part is separable from the first stage part by being movable in a vertical direction relative to the first stage part while supporting the substrate.

8. The inkjet printing apparatus of claim 6, further comprising:
a third stage part disposed around the first stage part and having a third thermal conductivity that is higher than the first thermal conductivity.

9. The inkjet printing apparatus of claim 8, wherein:
the second stage part is separable from the third stage part, and
at least one of the second stage part and the third stage part is movable in a vertical direction while supporting the substrate.

10. The inkjet printing apparatus of claim 8, wherein:
at least one of the second stage part and the third stage part includes a cooling unit.

11. The inkjet printing apparatus of claim 1, wherein:
the first stage part includes at least one of polyetheretherketone, polycarbonate, polyoxymethylene, and polypropylene.

12. The inkjet printing apparatus of claim 1, wherein:
the second stage part includes a metal.

13. The inkjet printing apparatus of claim 1, wherein:
the substrate includes a first region above the first stage part and a second region above the second stage part, and
resin on the first region is at a higher temperature than resin on the second area.

14. The inkjet printing apparatus of claim 13, wherein:
a width of the second region above the second stage part is about 0.3 mm to about 3 mm.

15. The inkjet printing apparatus of claim 1, further comprising:
a third stage part overlapping at least a portion of the first stage part and having a higher thermal conductivity than the first stage part.

16. The inkjet printing apparatus of claim 15, wherein:
an upper surface of the first stage part and an upper surface of the third stage part are coplanar.

17. The inkjet printing apparatus of claim 15, wherein:
the first stage part includes at least one of polyetheretherketone, polycarbonate, polyoxymethylene, and polypropylene.

18. The inkjet printing apparatus of claim 15, wherein:
the third stage part includes metal.

19. The inkjet printing apparatus of claim 15, wherein:
the substrate includes a first region above the first stage part and a third region above the third stage part, and
resin on the first region has a higher temperature than resin on the third region.

20. The inkjet printing apparatus of claim 15, wherein the third stage part includes a cooling unit.

* * * * *